8979X
A. M. Eastwick,
Steam Cut-Off.
Patented July 21, 1835.
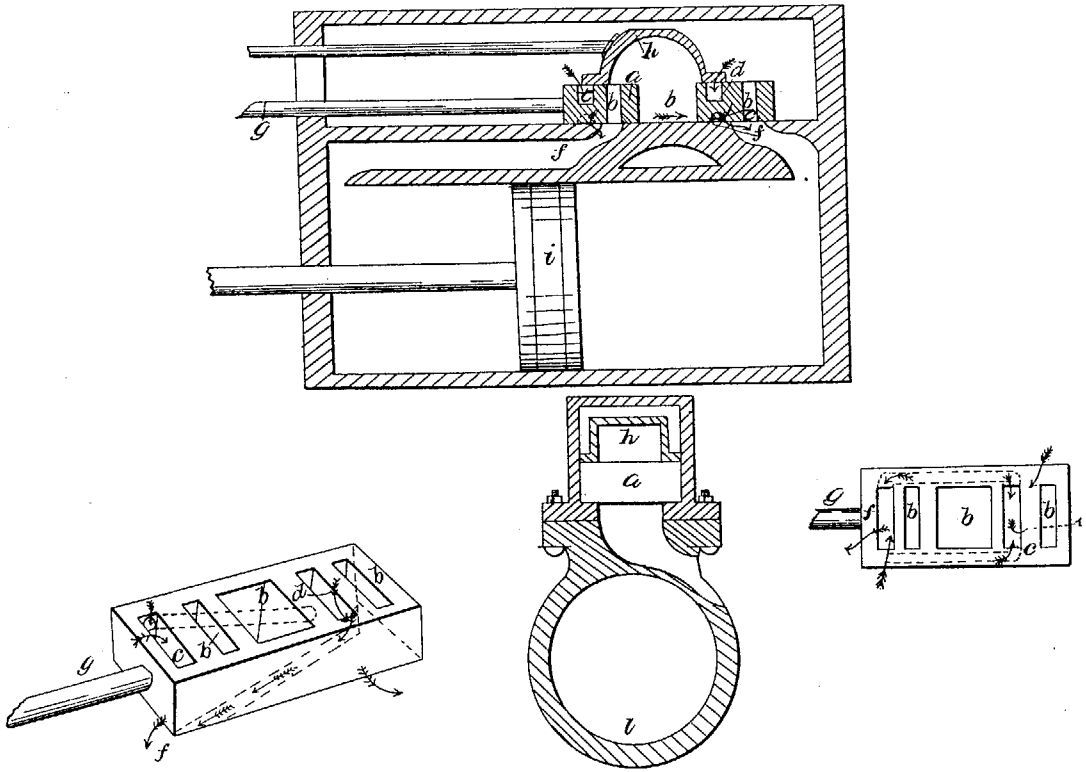
AM. PHOTO-LITHO. CO. N.Y. (OSBORNE'S PROCESS.)

July 21. 1835 8979X 7/21/1835 5/3

Andrew M. Eastwick
Letters Patent dated July 21. 1835.—

The Schedule referred to in these Letters Patent and making part of the same
containing a description in the words of the said Andrew M. Eastwick
himself of his improvement in the construction of slide valves for steam
Engines

---

To all whom it may concern. Be it known that I Andrew M. East-
wick of the City of Philadelphia in the State of Pennsylvania have in-
vented an improved slide valve for steam engines by means of which the
action of the engine may be reversed with the utmost facility thereby render-
ing the improved valve of special utility for engines for steam boats
Locomotives for rail roads and other purposes. And I do hereby declare
that the following is a full and exact description thereof. The slide and
steam chest do not differ in their general construction from those in or-
dinary use, but to the latter an increased length and depth are given to ad-
mit of an additional sliding piece which I denominate a reversing
shifting valve seat and upon the use of which my improved valve is depen-
dent the permanent valve seat, also upon the body of the cylinder is furn-
ished with openings into steam ways leading into each end thereof and
with an escape opening, which do not differ from those in ordinary use.
The reversing shifting valve seat above alluded to has five openings in it,
three of which pass directly through it and are so situated during the ordi-
nary action of the engine as to coincide with the steam ways and discharge
openings upon the cylinder. The other two openings do not pass directly
through the shifting valve seat but each of them after descending nearly
halfway through the seat is continuous laterally passing along by the
ends of two of the direct openings first described and terminating on the
opposite face of the shifting valve seat. The two lateral communications
are at opposite ends of the direct openings. By this arrangement of these
two extra openings the steam which is admitted into one of them does not
pass into the steam way of the cylinder which is directly under it, but
into

8979X into that leading to the opposite end thereof. In consequence of construct-
ing the shifting valve seat in this manner all that is necessary to reverse
the motion of the engine is to slide the shifting seat so as to bring the revers-
ing openings into action and to throw the ordinary openings out of action.
For this purpose a rod connected with the shifting valve seat passes
through a stuffing box in the steam chest so that by means of a lever, cam,
or other contrivance, it may be instantaneously shifted in either direc-
tion. The steam chest must of course be made of such length as is neces-
sary for this purpose. The openings which are not in action are closed by the
divisions between the steam and discharge ways, and by the solid parts of
the valve seat. What I claim as my invention is the construction of the revers-
ing shifting valve seat containing the reversing openings constructed upon
the principle or in the manner herein set forth whether the same be made
precisely in the form described or in any other which is substantially the
same producing a similar effect by analogous means.

Witnesses
Matilda C. Binns
Andrew Geyer

Andrew M. Eastwick (398 wds)